US008910023B2

(12) United States Patent
Yang

(10) Patent No.: US 8,910,023 B2
(45) Date of Patent: *Dec. 9, 2014

(54) SOFT DECODING FOR QUANTIZED CHANNEL

(71) Applicant: Marvell World Trade Ltd., St. Michael (BB)

(72) Inventor: Xueshi Yang, Cupertino, CA (US)

(73) Assignee: Marvell World Trade Ltd. (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,843

(22) Filed: Sep. 23, 2013

(65) Prior Publication Data

US 2014/0026014 A1    Jan. 23, 2014

Related U.S. Application Data

(63) Continuation of application No. 12/959,891, filed on Dec. 3, 2010, now Pat. No. 8,549,385.

(60) Provisional application No. 61/286,505, filed on Dec. 15, 2009.

(51) Int. Cl.
*G06F 11/00* (2006.01)
*G06F 11/10* (2006.01)
*H04L 1/00* (2006.01)

(52) U.S. Cl.
CPC ............ *G06F 11/1068* (2013.01); *H04L 1/005* (2013.01)
USPC ........................................................ 714/773

(58) Field of Classification Search
USPC ........................................................ 714/773
See application file for complete search history.

(56) References Cited

U.S. PATENT DOCUMENTS

| | | | |
|---|---|---|---|
| 7,636,399 B2 | 12/2009 | Brown et al. | |
| 7,975,209 B2 | 7/2011 | Chin et al. | |
| 8,149,959 B1 | 4/2012 | Varnica et al. | |
| 2007/0258533 A1 | 11/2007 | Tsai et al. | |
| 2010/0034018 A1 | 2/2010 | Yang et al. | |
| 2010/0088575 A1 | 4/2010 | Sharon et al. | |
| 2010/0157878 A1 | 6/2010 | Zeitler et al. | |
| 2010/0246289 A1 | 9/2010 | Vigoda et al. | |
| 2010/0303176 A1 | 12/2010 | Lilleberg et al. | |

*Primary Examiner* — Bryce Bonzo

(57) ABSTRACT

Systems, methods, and other embodiments associated with soft decoding for a quantized channel are described. According to one embodiment, a method includes repetitively controlling the soft decoder to attempt to decode the signal based, at least in part, on a reliability measure selected from a pre-determined collection of reliability measures. When the soft decoder fails to decode the signal, the method includes computing a new reliability measure and repetitively controlling the soft decoder to attempt to decode the signal based, at least in part, on the new reliability measure. When the soft decoder decodes the signal with the new reliability measure, the method includes adding the new reliability to the pre-determined collection of reliability measures.

20 Claims, 4 Drawing Sheets

SOFT DECODING FOR QUANTIZED CHANNEL

CROSS REFERENCE TO RELATED APPLICATIONS

This disclosure is a continuation of U.S. application Ser. No. 12/959,891 filed on Dec. 3, 2010, now U.S. Pat. No. 8,549,381 which claims benefit under 35 USC §119(e) to U.S. provisional application Ser. No. 61/286,505 filed on Dec. 15, 2009, which is hereby wholly incorporated by reference.

BACKGROUND

Soft decoding of signals associated with a quantized channel suffers from well known fidelity and speed problems. Attempts have been made to improve the fidelity of soft decoding. These attempts have, in some cases, frustrated attempts to improve the speed at which signals are decoded. Similarly, attempts to improve decoding speed have frustrated improving fidelity.

Soft decoding may depend on a log likelihood ratio (LLR). An LLR is a measure of the reliability of a decoded value. The value may be decoded from a signal received from a quantized channel. One example of a quantized channel is a memory (e.g., NAND flash memory). In one NAND flash memory embodiment, an LLR>0 may indicate that a bit from the memory is likely a 0 while an LLR<0 may indicate that the bit is likely a 1. The validity of the indication may be checked using different validity checks including, for example, parity checks and error correction code processing. An LLR may be described according to:

$$LLR = \log\left(\frac{P(v=1|S_v)}{P(v=0|S_v)}\right) \quad LLR = \frac{P(v=0|S_v)}{P(v=1|S_v)}$$

where P is the probability, v is the value, and $S_v$ is the signal associated with the value.

Thus, an LLR is the log of: the probability that the value is a zero given current constraints and observations (e.g., the signal) divided by the probability that the value is one given current constraints and observations (e.g., the signal). The likelihood that the value decoded from the signal is correct varies directly with the magnitude of the LLR, meaning that the larger the LLR magnitude, the more likely the value decoded from the signal is correct.

Threshold voltage distributions for a NAND memory may be known and characterized. For example, the mean and variance for a Gaussian distribution may be known. In this case, if the reference voltages for the memory are also known, then LLRs can be computed that facilitate accurately and quickly decoding the quantized signals. However, in practice, the mean and variance may not be known, and the distribution may not be perfectly Gaussian. Therefore, it may be difficult to calculate LLRs making it difficult, in turn, to accurately and quickly decode quantized signals when soft error correction code decoder is used.

Conventionally, LLRs may have been chosen for a decoder in an iterative manner using trial and error. Typically, each LLR calculation started from scratch with hopes that a convergence would be reached and that a value could be decoded. These conventional approaches may have consumed undesirable amounts of time and power while providing lower than desired fidelity.

SUMMARY

In one embodiment an apparatus includes a soft decoder, a reliability memory, and a controller. The soft decoder is configured to decode a signal received from a quantized channel based, at least in part, on one or more log likelihood ratios (LLRs). The reliability memory is configured to store one or more known LLRs. The known LLRs are stored in the reliability memory prior to the soft decoder receiving the signal to be decoded. The controller is configured to repetitively and selectively provide the soft decoder with known LLRs chosen from the reliability memory, control the soft decoder to decode the signal. When the soft decoder fails to decode the signal with the known LLRs the controller is configured to compute one or more new LLRs, to repetitively and selectively provide the soft decoder with the new LLRs, and store the new LLRs as known LLRs in the reliability memory upon determining that the soft decoder successfully decoded the signal with the new LLRs.

In one embodiment, a method for controlling a soft decoder to decode a signal received from a quantized channel is provided. The method includes repetitively controlling the soft decoder to attempt to decode the signal based, at least in part, on a reliability measure selected from a pre-determined collection of reliability measures. When the soft decoder fails to decode the signal, the method includes computing a new reliability measure and repetitively controlling the soft decoder to attempt to decode the signal based, at least in part, on the new reliability measure. When the soft decoder decodes the signal with the new reliability measure, the method includes adding the new reliability to the pre-determined collection of reliability measures.

In one embodiment, an apparatus includes a reliability memory and a controller. The reliability memory is configured to store one or more known log likelihood ratios (LLRs) for use by a soft decoder in decoding a signal received from a quantized channel. The controller is configured to store LLRs that when used by the soft decoder to decode a signal result in a successful decoding of the signal as known LLRs in the reliability memory. The controller is also configured to repetitively and selectively provide the soft decoder with known LLRs chosen from the reliability memory.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Described herein are example apparatuses, methods, and other embodiments associated with soft decoding for a quantized channel. In one embodiment, a soft decoder is initially programmed with LLR values that have been used in previous successful decoding of signals from a quantized channel. When a decode succeeds, the LLR values that produced the successful decode may be stored for subsequent usage and thus knowledge about successful decoding is persisted. Different LLR values may be stored for different signal sources (e.g., different memory pages). Different LLR values may also be stored for signal sources having different properties (e.g., memory pages having different access frequencies). In one embodiment, multiple soft decoders may be programmed to attempt decoding in parallel, and a successful decode may be selected from the multiple decoders. In another embodiment, a decoder(s) may be programmed serially with stored LLR values until a successful decode is performed or until the stored values are exhausted. In another embodiment, a decoder(s) may be programmed with LLR values computed from stored LLR values. For example, the average of successful LLR values can be computed and used to program the soft decoder(s).

Figure 1:
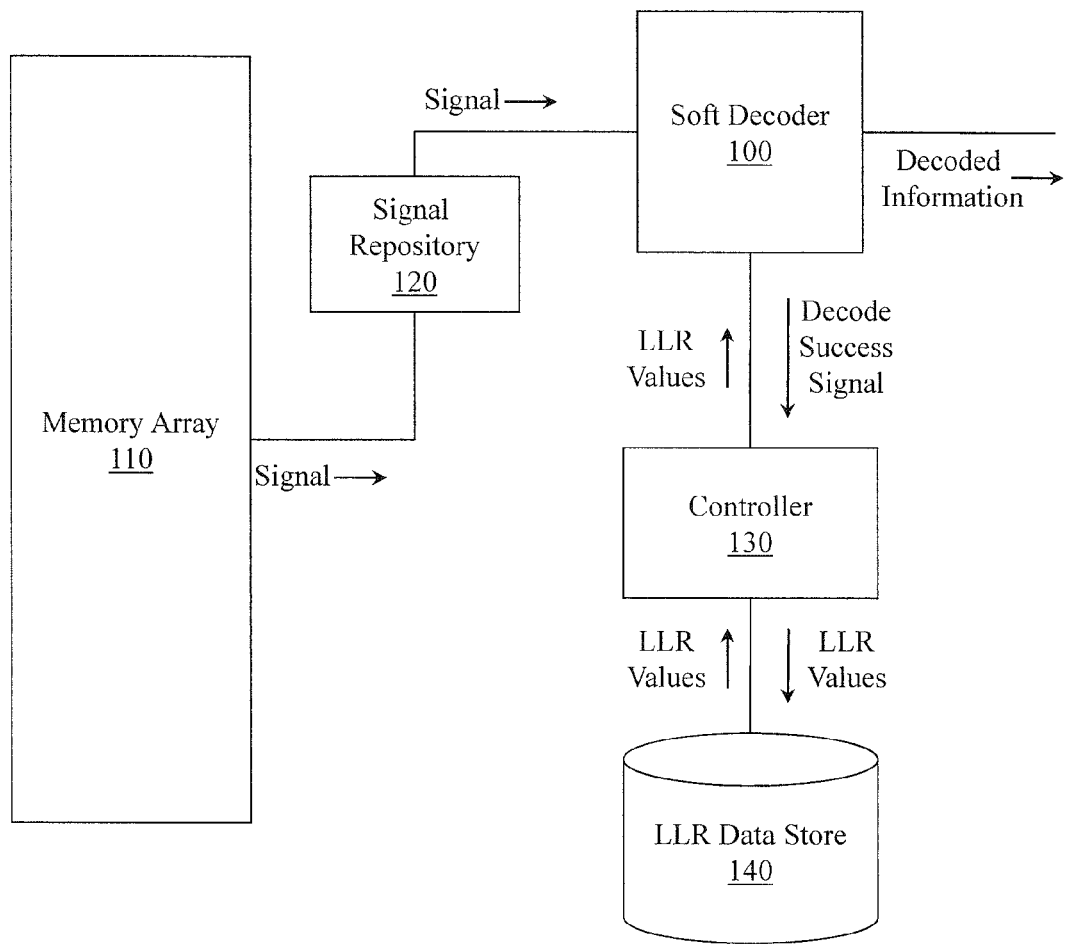
FIG. 1 illustrates one embodiment of units involved in soft decoding for a quantized channel.

FIG. 1 illustrates one embodiment of units involved in soft decoding for a quantized channel. A soft decoder 100 is configured to decode a signal received from a quantized channel (e.g., memory array 110) via a signal repository 120. A controller 130 may program the soft decoder 100 with log likelihood ratios (LLRs) stored in an LLR data store 140. The LLR data store 140 may be, for example, a reliability memory. While LLRs are described, more generally, the controller 130 can program a soft decoder with reliability measures to facilitate soft decoding of signals received from a quantized channel.

In one embodiment, the controller 130 is configured to repetitively and selectively program the soft decoder 100 with known LLRs chosen from the data store 140. The known LLRs may be, for example, LLRs that were used previously to successfully decode a signal from the quantized channel. The controller 130 will program the soft decoder 100 until a successful decode occurs or until a termination condition is reached. The termination condition may be, for example, that a pre-determined number of decode attempts have been made, that a pre-determined amount of time has expired, and so on.

The controller 130 is also configured to control the soft decoder 100 to decode the signal and to selectively update the data store 140 upon determining that the soft decoder 100 successfully decoded the signal using a known LLR. Updating the data store may include adding an LLR to the data store 140, re-ordering entries in the data store 140, and so on.

The controller 130 first programs the soft decoder 100 with values from the data store 140. These values may include, for example, a default LLR, one or more LLRs previously used by the soft decoder 100 to successfully decode a signal previously received from the quantized channel, and one or more LLRs computed from other LLRs in the data store 140.

A successful decode may not be achieved using the values in the data store 140. Therefore, the controller 130 may also be configured to compute a new LLR(s) that is not present in the data store 140. The controller 130 may then repetitively and selectively program the programmable soft decoder 100 with the new LLRs so that the soft decoder 100 can attempt to decode with the new values. A new value that yields a successful decode may be stored in the data store 140 by the controller 130.

While a single quantized channel (e.g., memory array 110) is illustrated, and while a single data store 140 is illustrated, soft decoder 100 may interact with more than one quantized channel or signal source. Additionally, a quantized channel or signal source may produce different signals from different physical and/or logical portions of the signal source. For example, more frequently accessed pages in memory array 110 may produce signals with different properties than less frequently accessed pages in memory array 110. Similarly, pages from one portion of the memory array 110 may produce signals with different properties than pages from another portion of the memory array 110. Therefore, the data store 140 may be configured to store first known LLRs associated with a first signal source and second known LLRs associated with a second signal source. Similarly, the data store 140 may be configured to store first known LLRs associated with signal sources having a first property and second known LLRs associated with signal sources having a second property. While two partitions of data store 140 are described, a greater number of partitions may be employed.

The controller 130 may be configured to store LLRs in the data store 140 in different ways. Storing the LLRs in different ways facilitates enhancing the order in which LLRs are provided to soft decoder 100 to facilitate improving decoding fidelity and/or reducing the amount of time required to achieve a successful decode. By way of illustration, the controller 130 may store values in data store 140 so that most recently successful LLRs may be accessed before successful LLRs from less recent decodes. Controller 130 may be configured to store values according to schemes including, but not limited to, a first in first out scheme, a last in first out scheme, a pre-determined pattern, and a random scheme. Similarly, controller 130 may be configured to access LLRs in the data store according to schemes including, but not limited to, a first in first out scheme, a last in first out scheme, a pre-determined pattern, and a random scheme.

Since the controller 130 tries to program the soft decoder 100 with LLRs that are likely to produce a successful decode, in one embodiment the controller 130 is configured to add to the data store 140 LLRs used by the soft decoder 100 to successfully decode the signal. Unlike conventional systems that start at the same place every time and that proceed along the same path every time, apparatuses and methods persist some knowledge about successful decodes so that starting points can be intelligently chosen.

Figure 2:
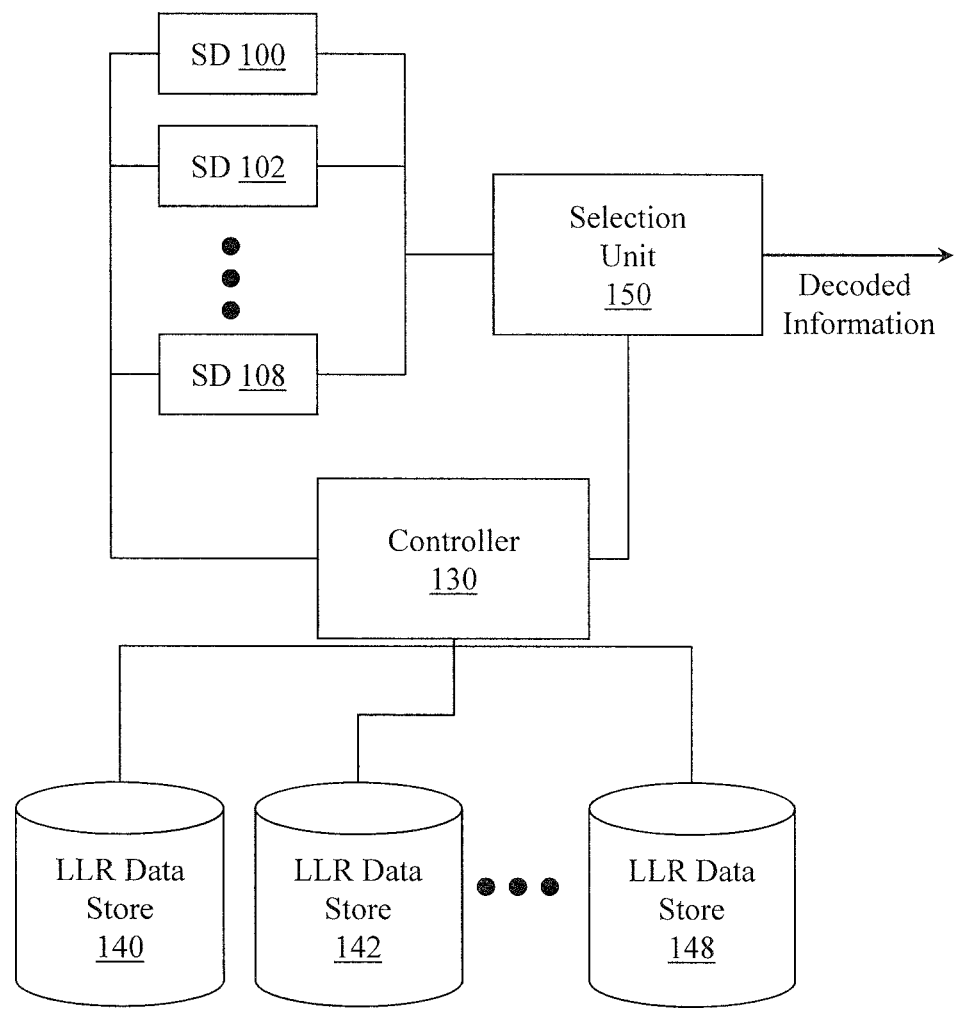
FIG. 2 illustrates another collection of units for soft decoding a signal received from a quantized channel.

FIG. 2 illustrates another collection of units for soft decoding a signal received from a quantized channel. Like the collection illustrated in FIG. 1, this collection includes a controller 130. However, this collection includes two or more soft decoders (e.g., SD 100, SD 102, . . . SD 108). Controller 130 can program the two or more soft decoders to operate in parallel and/or substantially in parallel and to use different LLRs. In different examples the parallel operation may be synchronized and/or may be asynchronous.

Since there are multiple soft decoders (SDs) that are attempting to decode a signal, a selection unit 150 is configured to identify a SD(s) that performs a successful decode. In one example, a first successful SD may be selected. In another example, two or more successful SDs may be selected. The selection unit 150 can provide decoded information and may also feedback information to controller 130.

The controller 130 may be configured to program the soft decoders 102 through 108 to operate substantially in parallel using different LLRs. The different LLRs may be chosen from previously known or stored LLRs. The different LLRs may also be computed by the controller 130. LLRs may be computed and provided by controller 130 when stored LLRs are exhausted.

This collection of units also illustrates multiple LLR data stores 140, 142, . . . 148. Controller 130 may select LLRs from different data stores (e.g., different reliability memories)

based on different properties of the signal(s) received from the quantized channel. One data store may be organized to provide LLRs according to a first scheme (e.g., FIFO), while another data store may be organized to provide LLRs according to a second scheme (e.g., LIFO). Additionally, different data stores may store different LLRs for different page ranges, for more or less frequently accessed pages, and so on.

Figure 3:
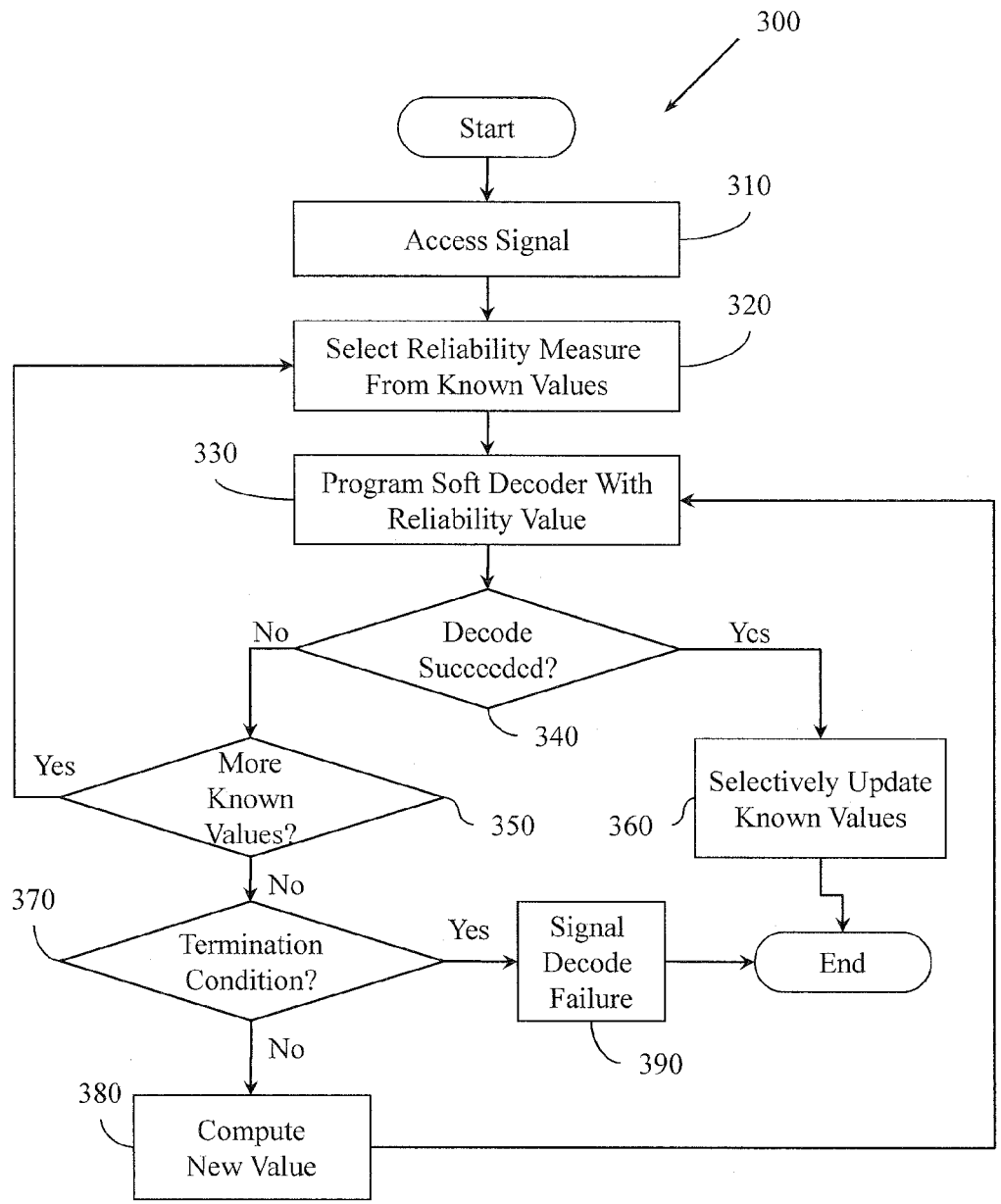
FIG. 3 illustrates one embodiment of a method associated with soft decoding for a quantized channel.

FIG. 3 illustrates one embodiment of a method 300 associated with soft decoding for a quantized channel. Method 300 facilitates controlling a soft decoder to decode a signal received from a quantized channel. The quantized channel may be, for example, a NAND flash memory. While a NAND flash memory is described, method 300 can be used to decode signals associated with other quantized channels.

Before decoding a signal, method 300 first accesses a signal at 310. In one embodiment, to facilitate reducing reads from the channel, the signals may be read once and stored in a buffer or other signal repository available to method 300. Thus, accessing the signal at 310 may not include performing a read operation from the quantized channel. Conventionally, decode attempts made with different programmed values may have been performed on data that was re-read from the quantized channel.

Conventionally, a reliability measure may have been chosen at random, or chosen from a pre-computed guess. However, method 300 does not rely on this type of random approach. Instead, method 300 relies on previous reliability measures that succeeded in decoding a signal from the quantized channel. Therefore, at 320, a reliability measure is selected from a pre-determined collection of reliability measures. In one embodiment, the reliability measure is a log likelihood ratio (LLR). Other reliability and/or probabilistic measures and values may be employed. In one embodiment, the pre-determined collection of reliability measures can include, but is not limited to including, a default value, a previously successful value, a pre-computed value, and a value derived from one or more other reliability measures. A value derived from one or more other reliability measures may be, for example, an average of other successful reliability measures, a weighted average of other successful reliability measures, the median of other reliability measures, and so on. The collection may be organized in different orders so that, for example, the most recently successful reliability measure is chosen first, the most frequently successful reliability measure is chosen first, and so on.

At 330, the soft decoder is programmed with the selected reliability measure. The soft decoder may then attempt to decode the signal accessed at 310 using the programmed in reliability measure.

At 340, a decision is made concerning whether the soft decoder was able to decode the signal. If the decision at 340 is YES, then at 360 the pre-determined collection of reliability measures may be updated. This may include, but is not limited to, re-ordering the collection, adding a member to the collection, eliminating a member of the collection, and adjusting a member of the collection. If the decision at 340 was NO, then at 350, another decision is made concerning whether there are any more known values. If the decision at 350 is YES, then processing returns to 320 where another known value is selected. If the decision at 350 is NO, then at 370 another decision is made concerning whether a termination condition has been reached. The termination condition may consider, for example, the number of decode attempts that have been made, the amount of time that has been spent trying to decode a value, whether any relevant reliability measures remain, and so on. If the decision at 370 is YES, then at 390 a decode failure is signaled and the method 300 ends. If the decision at 370 is NO, then a new value is computed at 380 and processing returns to 330. While processing is illustrated returning to 330, processing may instead proceed to another path that would not include checking whether more known values were available.

Method 300 causes the repetitive controlling of the soft decoder to attempt to decode the signal based, at least in part, on a reliability measure selected from a pre-determined collection of reliability measures until, for example, the signal is successfully decoded or a pre-determined number of reliability measures from the pre-determined collection of reliability measures have been tried without successfully decoding the signal. In one embodiment, method 300 also includes providing an initial decode fail signal upon determining that the soft decoder has tried the pre-determined number of reliability measures from the pre-determined collection of reliability measures without successfully decoding the signal.

In one embodiment, method 300 also includes performing actions other than just selectively updating the pre-determined collection of reliability measures at 360. These actions are performed upon determining that the soft decoder has successfully decoded the signal. These actions can include, but are not limited to, providing a decode complete signal, and providing decoded information associated with the signal.

If the signal cannot be decoded using previously known reliability values, then method 300 may also cause the computing of a new reliability measure(s) and the repetitive controlling of the soft decoder to attempt to decode the signal based, at least in part, on the newly computed reliability measure(s). In one embodiment, decode attempts will continue until the signal is successfully decoded or a termination condition is reached. The termination condition may be, for example, that a pre-determined number of decode attempts have been made, that a pre-determined period of time has elapsed, and so on.

In one embodiment, method 300 initially tries to decode a signal using reliability measures that have previously been successful in decoding a signal. Therefore, method 300 includes, at 360, upon determining that the soft decoder has successfully decoded the signal based on a newly computed reliability measure, selectively updating the pre-determined collection of reliability measures with the new reliability measure. Updating the collection may include adding a new value, re-ordering values, computing new values based on the new value, deleting a value, and so on.

In one embodiment, the pre-determined collection of reliability measures may store a single set of reliability measures. However, in other embodiments, the pre-determined collection may be organized into separate collections. For example, a first collection of reliability measures may be associated with first signal sources and a second collection of reliability measures associated with second signal sources. The first signal sources may, for example, be within a certain address range in a memory or may be associated with a certain memory array. Similarly, the second signal sources may, for example, be within a different address range in a memory or may be associated with a different memory array. The pre-determined collection may also be organized into different sets based on signal source properties. For example, one collection of reliability measures (e.g., LLRs) may be available for pages that have been accessed less than a threshold number of times while another collection of reliability measures may be available for pages that have been accessed more than the threshold number of times. While two collections are described, and while addresses and access numbers are described, a greater number of collections may be employed for different attributes.

Sometimes the decode will fail. Therefore method 300 includes, at 390, upon determining at 370 that the termination condition has been reached, controlling the soft decoder to provide a final decode fail signal.

Method 300 illustrates trying one decode at a time. In one embodiment, a parallel version of method 300 may be employed. In this embodiment, method 300 would include repetitively controlling two or more soft decoders to attempt to decode the signal in parallel based, at least in part, on different reliability measures selected from the pre-determined collection of reliability measures until, for example, the signal is successfully decoded or a pre-determined number of reliability measures from the pre-determined collection of reliability measures have been tried without successfully decoding the signal.

If the decode fails using the pre-determined collection of reliability measures, then in one example, new reliability measures may be computed and tried. Therefore, the parallel embodiment of method 300 may also include repetitively controlling the two or more soft decoders to attempt to decode the signal based, at least in part, on different new reliability measures, until, for example, the signal is successfully decoded or a termination condition is reached.

Recall that method 300 begins by trying previously successful reliability measures. Therefore, upon determining that the signal has been successfully decoded based on a new reliability measure(s), method 300 may include selectively updating the pre-determined collection of reliability measures. Since decoding proceeds in parallel, it is possible that two decoders with different reliability measures could both successfully decode the signal. Therefore, the collection may be updated with the actual value that was successful from one decoder, with the actual values that were successful from two or more decoders, with a value based on the one or more new reliability measures used by the two or more soft decoders to successfully decode the signal, or with other values. By way of illustration, if two decoders both successfully decoded the signal, then the average of the two reliability measures may be inserted into the collection.

The following pseudocode represents a portion of one embodiment of method 300.

```
access stored values;
set decode to FALSE;
set LLRavailable to TRUE;
Set LLRcurrent to LLRdefault;
while ( (decode == FALSE) AND (LLRavailable == TRUE) )
{
    decode stored values using LLRcurrent;
    if (decode was successful) then
    {
        set decode to TRUE;
        update stored values with LLRcurrent;
    }
    else
    {
        if (another LLR is available) then
        {   set LLRcurrent to next available LLR; }
        else
        { set LLRavailable to FALSE; } //end if
    } // end if
} // end while
```

Figure 4:
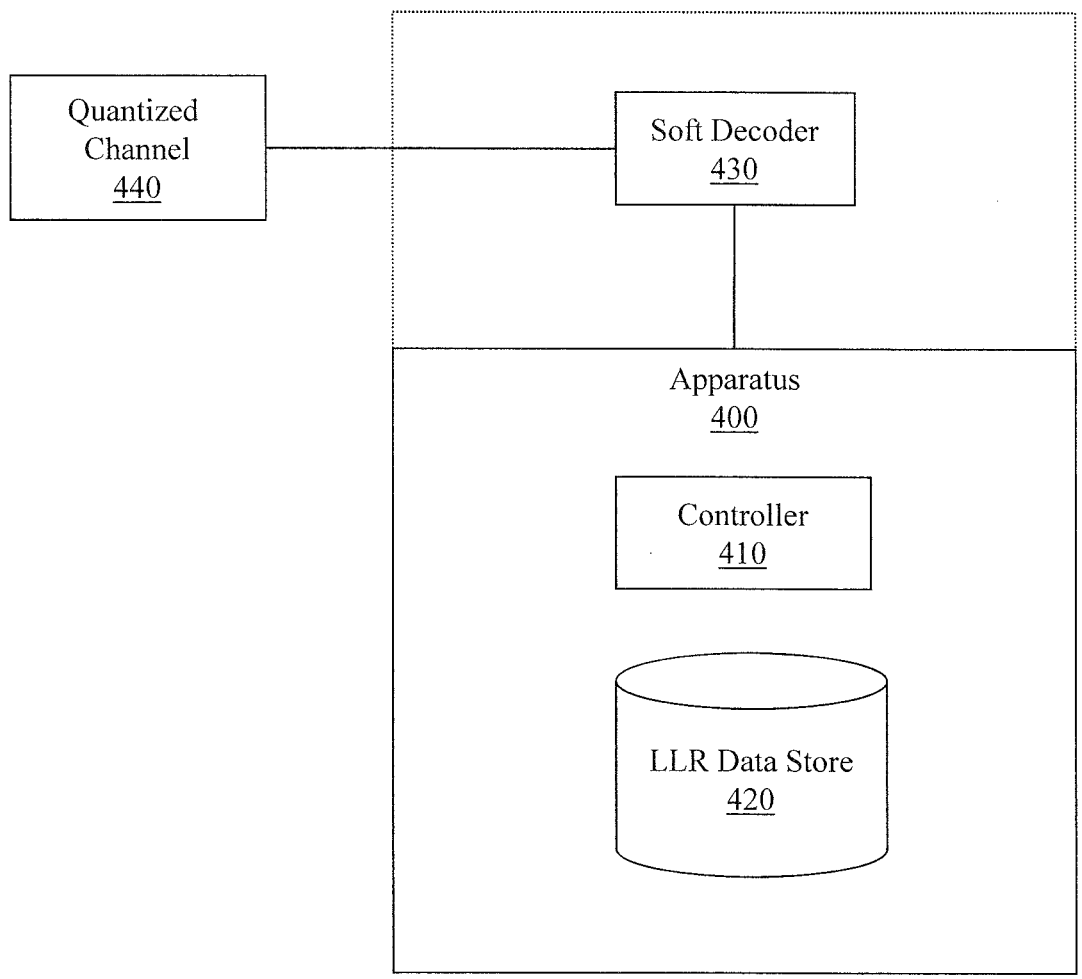
FIG. 4 illustrates one embodiment of an apparatus for soft decoding a signal received from a quantized channel.

FIG. 4 illustrates one embodiment of an apparatus 400 associated with soft decoding a signal received from a quantized channel. The apparatus 400 includes a controller 410 and an LLR data store 420. The data store 420 may be, for example, a reliability memory. The controller 410 selects values from data store 420 for programming soft decoder 430. Soft decoder 430 does soft decoding of signals received from quantized channel 440. In one embodiment, apparatus 400 interacts with soft decoder 430 while in another embodiment apparatus 400 includes soft decoder 430.

In one embodiment, decoder 430 is configured to soft decode a signal from a quantized channel 440 based, at least in part, on a log likelihood ratio (LLR). The controller 410 is configured to select the LLR from LLRs stored in data store 420. Data store 420 is configured to store LLRs that include at least one LLR previously used by the decoder 430 to successfully decode a signal from the quantized channel 440.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    a soft decoder configured to decode a signal received from a quantized channel based, at least in part, on one or more log likelihood ratios LLRs);
    a reliability memory configured to store one or more known LLRs, wherein the known LLRs are stored in the reliability memory prior to the soft decoder receiving the signal to be decoded; and a controller configured to:
repetitively and selectively provide the soft decoder with known LLRs chosen from the reliability memory,
control the soft decoder to decode the signal, and
when the soft decoder fails to decode the signal with the known LLRs:
to compute one or more new LLRs;
to repetitively and selectively provide the soft decoder with the new LLRs; and
store the new LLRs as known LLRs in the reliability memory upon determining that the soft decoder successfully decoded the signal with the new LLRs.

2. The apparatus of claim 1, wherein the one or more known LLRs stored in the reliability memory include one or more of, a default LLR, one or more LLRs previously used by the soft decoder to successfully decode a signal previously received from the quantized channel, and one or more LLRs computed from other LLRs in the reliability memory.

3. The apparatus of claim 1, wherein the reliability memory is configured to store first known LLRs associated with a first signal source and second known LLRs associated with a second signal source.

4. The apparatus of claim 1, wherein the controller is configured to store LLRs in the reliability memory according to one or more of, a first in first out scheme, a last in first out scheme, a pre-determined pattern, and a random scheme and wherein the controller is configured to access LLRs in the reliability memory according to one or more of, a first in first out scheme, a last in first out scheme, a pre-determined pattern, and a random scheme.

5. The apparatus of claim 1, the apparatus further comprising:
a memory array;
a signal repository configured to store the signal; and
a set of connections to carry the signal from the memory array to the soft
decoder via the signal repository.

6. The apparatus of claim 1, the apparatus further comprising:
one or more additional soft decoders configured to operate in parallel with the soft decoder; and
a selection unit configured to identify one or more soft decoders in the apparatus that have successfully decoded the signal;
wherein the controller is further configured to provide the soft decoder and the one or more additional soft decoders with different known LLRs based on an LLR used to successfully decode the signal.

7. A method for controlling a soft decoder to decode a signal received from a quantized channel, comprising:
repetitively controlling the soft decoder to attempt to decode the signal based, at least in part, on a reliability measure selected from a pre-determined collection of reliability measures; and
when the soft decoder fails to decode the signal:
computing a new reliability measure;
repetitively controlling the soft decoder to attempt to decode the signal based, at least in part, on the new reliability measure; and
when the soft decoder decodes the signal with the new reliability measure, adding the new reliability to the pre-determined collection of reliability measures.

8. The method of claim 7, further comprising:
upon determining that the soft decoder has tried the pre-determined number of reliability measures from the pre-determined collection of reliability measures without successfully decoding the signal, providing an initial decode fail signal.

9. The method of claim 7, wherein the reliability measure comprises a log likelihood ratio.

10. The method of claim 7, wherein the pre-determined collection of reliability measures includes one or more of, a default value, a previously successful value, a pre-computed value, and a value derived from one or more other reliability measures.

11. The method of claim 7, wherein the quantized channel is associated with a NAND flash memory.

12. The method of claim 7, wherein the pre-determined collection of reliability measures is organized into a first collection of reliability measures associated with one or more of, a first set of signal addresses, and a first set of signal source properties and a second collection of reliability measures associated with one or more of, a second set of signal addresses, and a second set of signal source properties.

13. The method of claim 7, further comprising:
repetitively controlling two or more soft decoders to attempt to decode the signal in parallel based, at least in part, on different reliability measures selected from the pre-determined collection of reliability measures.

14. The method of claim 13, further comprising upon detecting the initial decode fail signal,
repetitively controlling the two or more soft decoders to attempt to decode the signal based, at least in part, on the one or more new reliability measures, and
upon determining that the signal has been successfully decoded based on the one or more new reliability measures, selectively updating the pre-determined collection of reliability measures with a value based on the one or more new reliability measures used by the two or more soft decoders to successfully decode the signal.

15. An apparatus, comprising:
a reliability memory configured to store one or more known log likelihood ratios (LLRs) for use by a soft decoder in decoding a signal received from a quantized channel; and
a controller configured to:
store LLRs, that when used by the soft decoder to decode a signal result in a successful decoding of the signal, as known LLRs in the reliability memory; and
repetitively and selectively provide the soft decoder with known LLRs chosen from the reliability memory to decode a subsequently received signal.

16. The apparatus of claim 15 wherein the controller is configured to:
control the soft decoder to decode the signal, and
when the soft decoder fails to decode the signal with the known LLRs:
to compute one or more new LLRs;
to repetitively and selectively provide the soft decoder with the new LLRs; and
store the new LLRs as known LLRs in the reliability memory upon determining that the soft decoder successfully decoded the signal with the new LLRs.

17. The apparatus of claim 15, wherein the one or more known LLRs stored in the reliability memory include one or more of, a default LLR, one or more LLRs previously used by the soft decoder to successfully decode a signal previously received from the quantized channel, and one or more LLRs computed from other LLRs in the reliability memory.

18. The apparatus of claim 15, wherein the reliability memory is configured to store first known LLRs associated with a first signal source and second known LLRs associated with a second signal source.

19. The apparatus of claim 15, wherein the controller is configured to store LLRs in the reliability memory according to one or more of, a first in first out scheme, a last in first out scheme, a pre-determined pattern, and a random scheme and wherein the controller is configured to access LLRs in the reliability memory according to one or more of, a first in first out scheme, a last in first out scheme, a pre-determined pattern, and a random scheme.

20. The apparatus of claim 15, the apparatus further comprising:
   the soft decoder; and
   a set of connections to carry the signal from the reliability memory to the soft decoder.

* * * * *